United States Patent [19]

Morin

[11] 4,045,148
[45] Aug. 30, 1977

[54] TURBINE

[76] Inventor: Bernard Morin, 1, rue Corneille, 78130 Les Mureaux, France

[21] Appl. No.: 628,650

[22] Filed: Nov. 4, 1975

[30] Foreign Application Priority Data

Nov. 4, 1974 France .................. 74.36632
Aug. 6, 1975 France .................. 75.24566
Sept. 1, 1975 France .................. 75.26787

[51] Int. Cl.$^2$ ................................ F03B 7/00
[52] U.S. Cl. .................... 416/84; 416/117
[58] Field of Search ............ 416/84–86, 416/117

[56] References Cited

U.S. PATENT DOCUMENTS

| | | | |
|---|---|---|---|
| 607,042 | 7/1898 | Jacob | 416/117 |
| 690,093 | 12/1901 | Beach | 416/86 |
| 887,142 | 5/1908 | Stevenson | 416/85 |
| 889,153 | 5/1908 | Roehr | 416/85 |
| 1,111,350 | 9/1914 | Bayleg | 416/117 |
| 1,148,989 | 8/1915 | Reese | 416/117 |
| 1,430,406 | 9/1922 | Schulthes et al. | 416/85 |
| 2,850,261 | 9/1958 | Rutkove | 416/84 |
| 3,442,492 | 5/1969 | Sullivan | 416/85 |

*Primary Examiner*—Everette A. Powell, Jr.

[57] ABSTRACT

A turbine with a water-driven motive element adapted for being immersed in a body of water and comprising a disc having a density close to that of the water in which it is immersed. The disc is horizontally disposed and has a plurality of cells containing a mixture of liquid and gas and the disc carries on the upper and lower surfaces thereof a plurality of blades which are pivotably movable about a horizontal axis. The blades each have at least one pocket containing a mixture of gas and a liquid such that the density of the blades connected to the upper surface of the disc is less than that of water and the density of the blades connected to the lower surface of the disc is greater than that of water. The disc carries a structure which holds the blades in one direction of pivotal movement when the blades reach a vertical position. As a consequence, under the action of water current, the blades are driven to their vertical position and they then effect rotation of the disc. The rotation of the disc serves to drive an electrical generator system.

10 Claims, 8 Drawing Figures

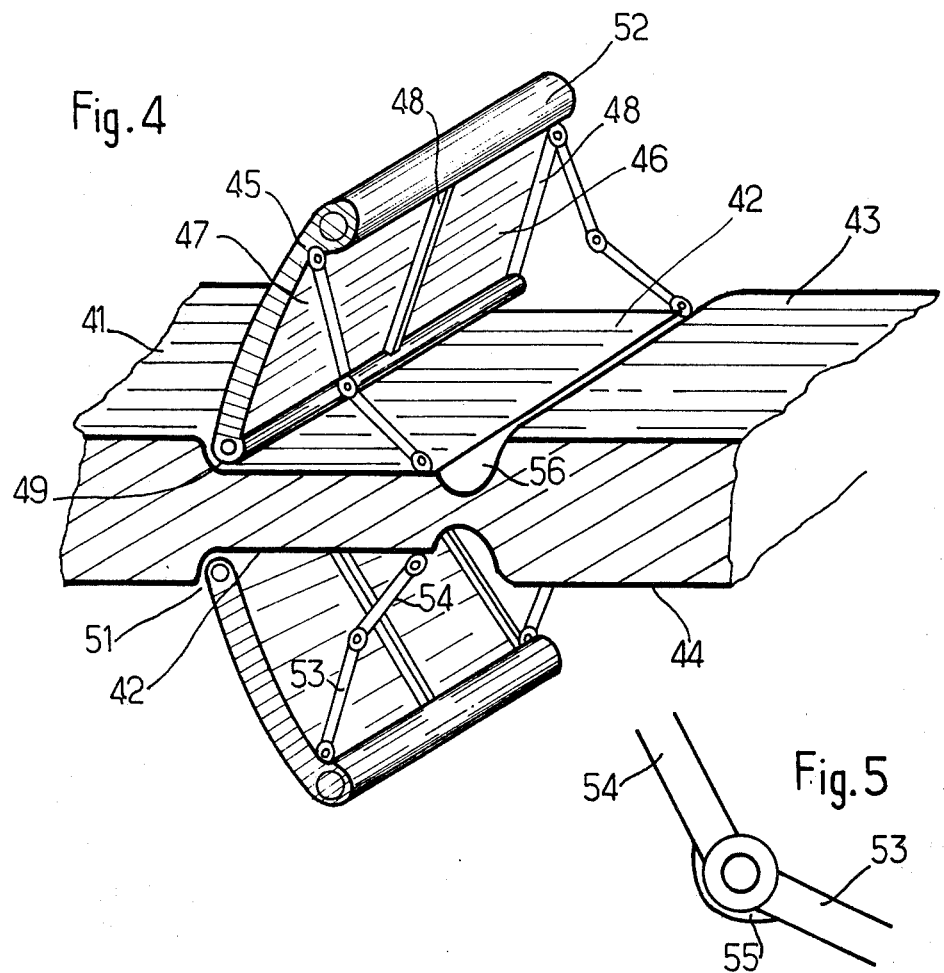
Fig. 4
Fig. 5
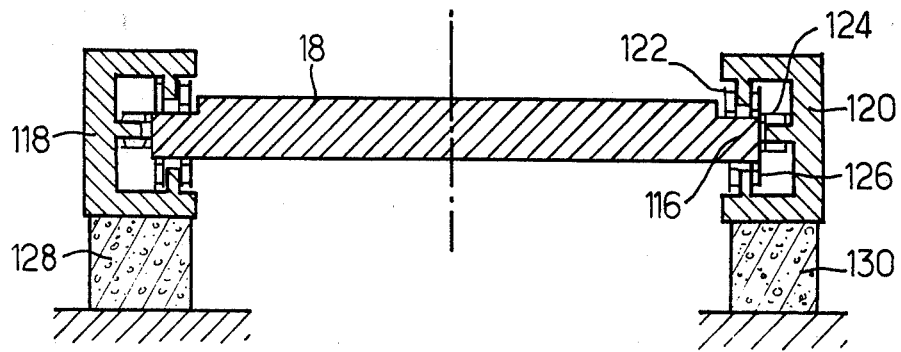
Fig. 3

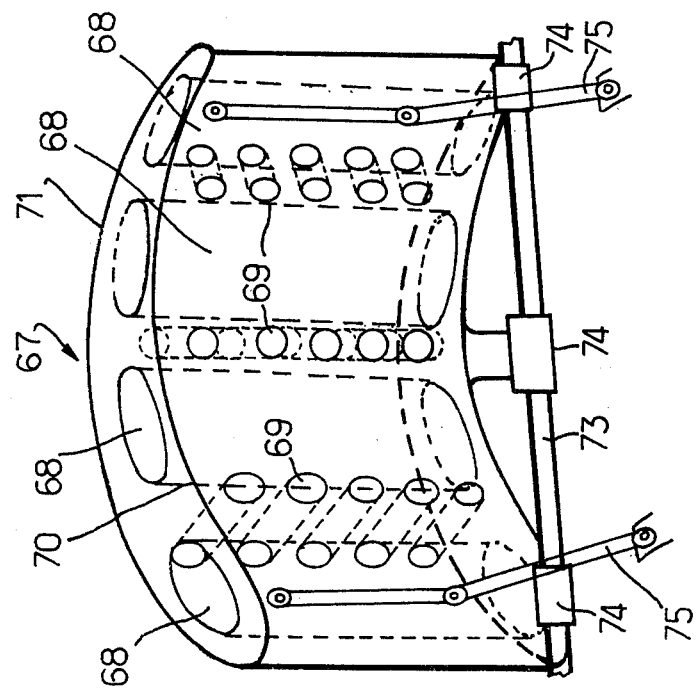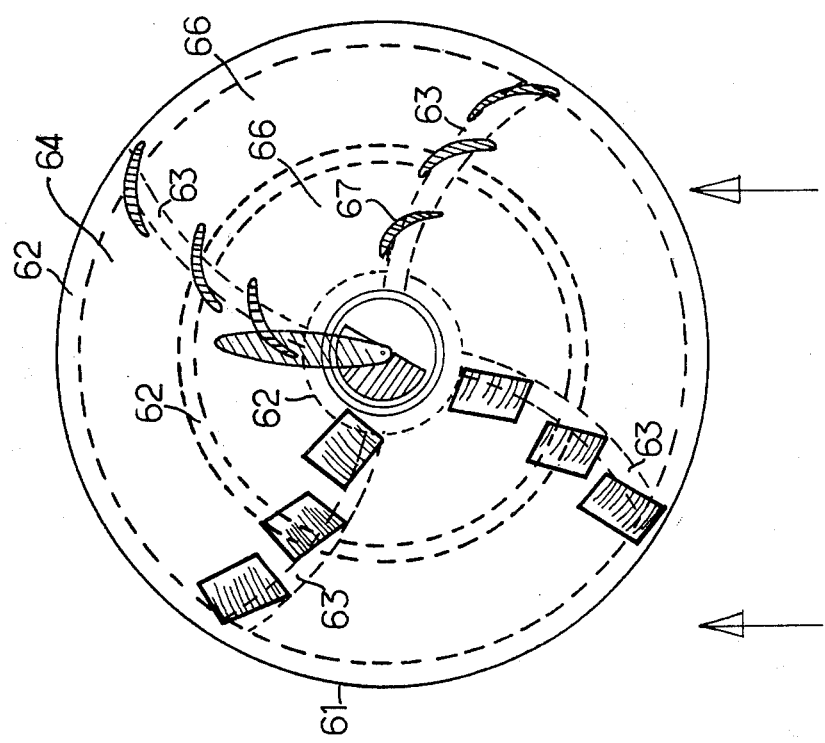

TURBINE

FIELD OF THE INVENTION

The present invention relates to a turbine with a current motor permitting particularly the transformation of energy from water current, for example, from the sea, the ocean or even rivers and streams, to an energy form which is directly utilizable.

SUMMARY OF THE INVENTION

A more particular object of the invention is a turbine comprising a structure rotatably mounted on a body of water, at least one series of articulated radial blades on the said rotatable structure, and means for blocking the blades in one direction in a substantially vertical position such that the turbine will be always driven in the same direction of rotation whatever the direction of the water current, even if this should vary or reverse itself.

This rotatable structure can be flush at the surface of the water or totally submerged.

In the case where it is flush at the surface of the water, this structure can comprise at least two arms diametrically opposed with respect to the axis of rotation, under each of which is pivotably mounted a longitudinal blade comprising a pocket of air at its lower portion and the movement of which in rotation is blocked in one direction when the blade arrives in a vertical position.

In the case where the structure is to be completely submerged, it comprises at least one horizontal disk whose density is in the neighborhood of that of the water in which the rotatable member is immersed, each disk carrying on at last one of its faces (upper or lower) at least two radial blades articulated on the disk and means for blocking the blades when the same arrive in vertical position, the density of the said blades being less than that of the water for the blades articulated on the upper face of the disk and greater than that of the water for the blades articulated on the lower face of the disk.

In this case, to reduce to a maximum the resistant couple due to the action of the current on the blades in closed position, the disk can comprise on its upper and lower faces two series of radial notches in which the blades are housed when they are in closed position.

The invention also contemplates a turbine with current motor having improved yield comprising instead of each of the radial blades, a series of blades reduced size having a reversed aerodynamic profile, suitably distributed along the length of a curved radius of the disk, the inclination of each of these blades with respect to the corresponding tangent of said radius being between 0° and 30°. In this case, the disk can comprise one coaxial circular opening in which is disposed a deflector pivotably mounted on a support structure resting on the body of water, this deflector being oriented with respect to the direction of the current by means of an aileron.

The invention finally proposes means for obtaining the rotation of the disk and this taking into account the inherent difficulties caused by the total immersion of the turbine.

BRIEF DESCRIPTION OF THE DRAWING

Several embodiments of the invention will be described hereafter by way of non-limitative example, with reference to the attached drawings in which:

FIG. 3 is a schematic diametral section taken through a turbine pivotably mounted by means of peripheral rollers carried on fixed support columns.

FIG. 4 is a partial sectional view taken perpendicularly to the axis of a blade of a turbine having improved output.

FIG. 5 shows on larger scale the central articulation mounting of a foldable brace.

FIG. 6 is a plan view of a disk of a turbine having evolute blades and provided with a central deflector.

FIG. 7 is a perspective view of a blade of the turbine shown in FIG. 1.

DETAILED DESCRIPTION

Figure 1:
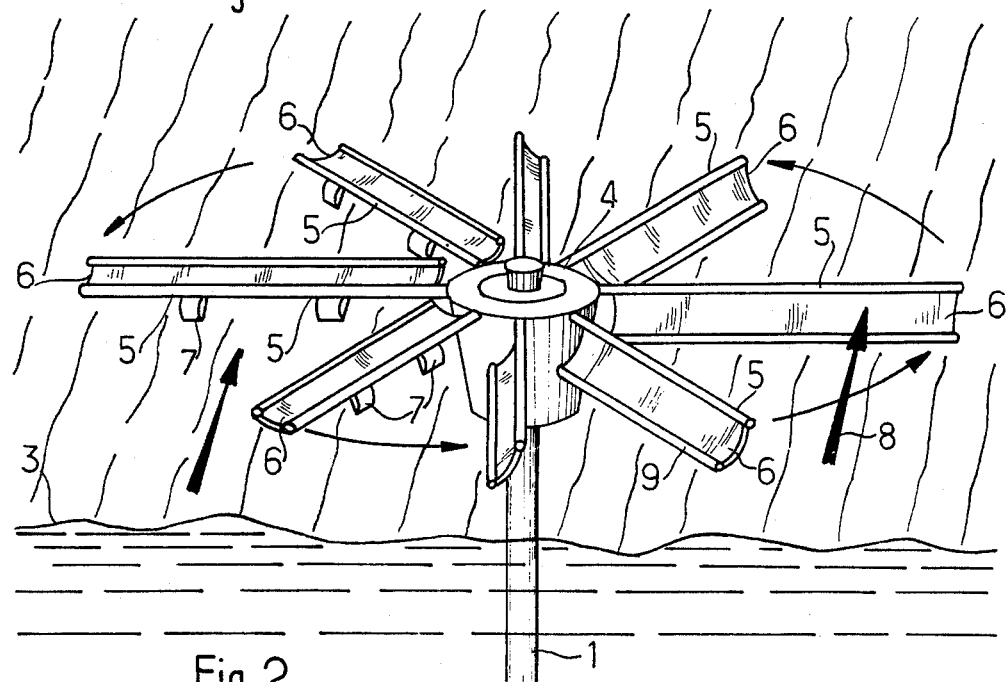
FIG. 1 shows a turbine in which the rotatable portion is intended to be flush at the surface of the water.

With reference to FIG. 1, the turbine comprises a vertical foot 1 fixedly mounted on the bed of a body of water for example, by means of a shrouded base in which it is fixed.

At the upper portion of the foot 1 which is flush at the surface 3 of the water, there is pivotably mounted a rotatable structure 4 carrying a plurality of horizontal radial arms 5.

On each of the arms 5 is pivotably mounted a blade 6 which extends over its entire length. The rotation of these blades 6 is blocked in one direction when the blades reach a vertical position by abutments 7 fixed to respective arms 5. Thus, the blades 6 situated on one side of the turbine, with respect to the direction of the current, arrow 8, are maintained vertically by the action of the abutments and receive the pressure of the current. In contrast, the blades 6 situated on the other side of the turbine and whose rotation is free in the direction of the current are displaced to horizontal position by the current and offer only minimum resistance thereto.

As a consequence, the turbine is subjected to a rotation and can drive an electrical generator or pump, not shown, fixed to the foot.

It will be noted that the foot 1 can slide axially in the base in a manner such that by the action of floats, the pivotal structure will be maintained permanently substantially at the level of the water surface even at the time of change of the water level, for example, in the case of water flow at the time of low tide or in flood periods. Furthermore, the foot 1 can comprises one or a plurality of articulations, permitting the structure to pivot and, as a consequence, the blades to take a position slightly inclined with respect to the horizontal and to also yield to the movement of the water, for example, in the case of a wave.

Figure 2:
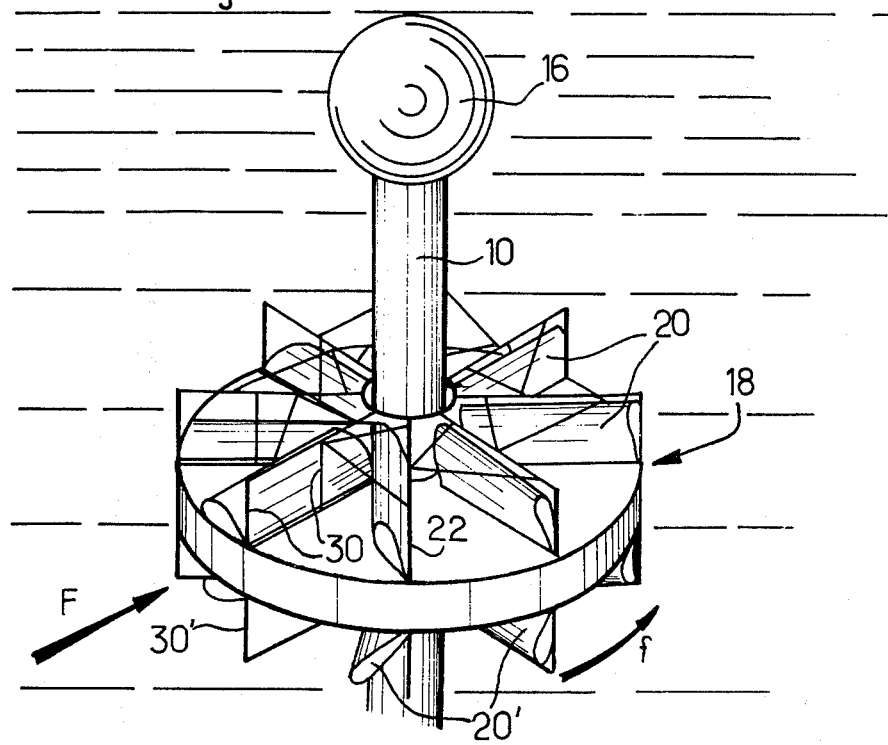
FIG. 2 is a schematic perspective view of a turbine having a current motor totally immersed and provided with a central foot.

With reference to FIG. 2, the turbine comprises a vertical foot 10 completely immersed in the water and fixed, for example, by means of anchoring cables, on a concrete shell at the bottom of the body of water or the sea. The maintainence in vertical position is obtained by reason of the fact that the foot has a density much lower than that of the water in which it is submerged. In this regard, the foot can be hollow and can carry at its upper extremity a stabilizing bulb 16 filled with air.

Coaxially with the foot 10, there is pivotably mounted at least one rotatable structure 18 comprising a disc of a density substantially equal to that of the water, in order that it is practically in equilibrium. The disc can be made of metal or of concrete.

On the upper face of the disc 18, there are pivotably mounted radial blades 20 each carrying an axle 22 disposed longitudinally in a radius of the disc and turning in bearings. The said axles and bearings can advantageously be replaced by cables.

According to the invention, the upper blades 20 are made lighter than the water, for example, by providing them with an internal pocket of air. Thus, at the time of immersion and in the absence of current, all of the upper blades 20 assume a natural upright position perpendicular to the plane of the disc 18.

The rotation of the upper blades 20 is blocked in one direction when these reach a vertical position by blockage means carried by the disc constituted, for example, by blocking stems 30.

With reference to FIG. 3, the disc comprises a peripheral edge 116 around which are disposed a plurality of stirrups, for example, eight in number, of which two, 118 and 120, are shown. The stirrups each carry three carriages 122, 124 and 126, and they are fixed to the top of support columns 128, 130. As a result of this construction, the foot of the turnable construction can be eliminated. The disc 18 is maintained in horizontal position due to the different rollers on which it rolls under the action of the current.

With reference to FIG. 4, the disc 41 of the turbine comprises two series of radial grooves 42 respectively provided on its upper face 43 and on its lower face 44. In each of these grooves, is pivoted a blade 45 whose lower face 46 mates in closed position with the internal surface of the groove 42. In the represented example, the blades 45 are constituted by a slightly curved plate 47 on the internal face of which is welded or riveted a succession of transverse reinforcements 48. The lower longitudinal edge 49 of the blade 45 is fixed to a continuous bearing (or a succession of bearings) in which extend one or more axles fixed to the disc 41 parallel to the lower longitudinal edge 51 of the groove 42 at the interior and in proximity thereto. The upper longitudinal edge of the blade is fixed to a tubular ballast 52, which permits adjustment of the density of the assembly of the blade 45 with respect to the medium in which it is placed. Thus, the ballast 52 of the upper blade can be empty and only contain air in order to make the density of the blade lower than water, whereas the ballast 52 of the lower blade can be partially filled with water in order to make the density of the blade slightly greater than water.

The blockage system of blades 45 in open position can comprise at least two foldable braces 53, 54 pivotably connected respectively to the reinforcement 48 in proximity to the ballast 52 and to the disc 41, at the interior of the groove 42. The opening of the two braces around their common pivot point is limited to an angle less than 180° by an abutment 55 fixed to one of the braces and against which the other brace comes into contact (FIG. 5).

In order to better distribute the pressure applied on a pair of blades 45 (upper and lower), there can be provided communication orifices between the corresponding pair of grooves (upper and lower).

With reference to FIG. 6, the water current turbine comprises a cellular pre-stressed disc 61 of reinforced concrete constituted by a series of coaxial circular beams 62 with radial curvilinear beams 63 and by two planar faces 64 namely, an upper face and a lower face, also made of pre-stressed reinforced concrete. It will be noted that in the embodiment of FIG. 6, for purposes of clarity, there are not shown more than three circular beams 62 and four curvilinear beams 63. However, the number of these beams can be much greater. The internal cavities or cells 66 of this disc are sealed and filled with air or any neutral gas whatever, at a pressure corresponding to that applied by the water on the disc at the depth to which it is immersed. On each of the faces of the disc are articulated a plurality of series of blades 67 of a density less than that of water for the upper blades and of a density greater than that of water for the lower blades.

The blades 67 of each one of these series are uniformly distributed above beams 63 and form therewith an angle of about 15°( the angle of the blade with the tangent to the beam 63 taken at the point of intersection of the blade 67 with the beam 63). The spacing of these blades 67 is such that they can retract without overlapping one another.

The blades 67 can also be formed of pre-stressed reinforced concrete with cells and can have a curved form whose concavity is adapted to face in the direction of the current. These blades 67 can comprise tubular cells 68 filled with pressurized gas or partially filled with water, according to the desired density of the blade (FIG. 7).

These blades can also include a series of holes 69 between the concave face 70 and the convex face 71 to increase the output of the turbine while raising the couple force applied on the blades when these are in a slightly inclined position with respect to the direction of the current. Indeed, in this case, there is produced turbulence which modifies the direction of the resultant of the forces applied on the blades 67 and this in the direction of an increase of the couple force furnished thereby.

The blades 67 can be pivoted on the disc by means of an axle 73 fixed to the disc 61 and bearing 74. Their rotation is limited by the foldable braces 75 pivotably connected to the blades 67 and the disc 61.

Figure 8:
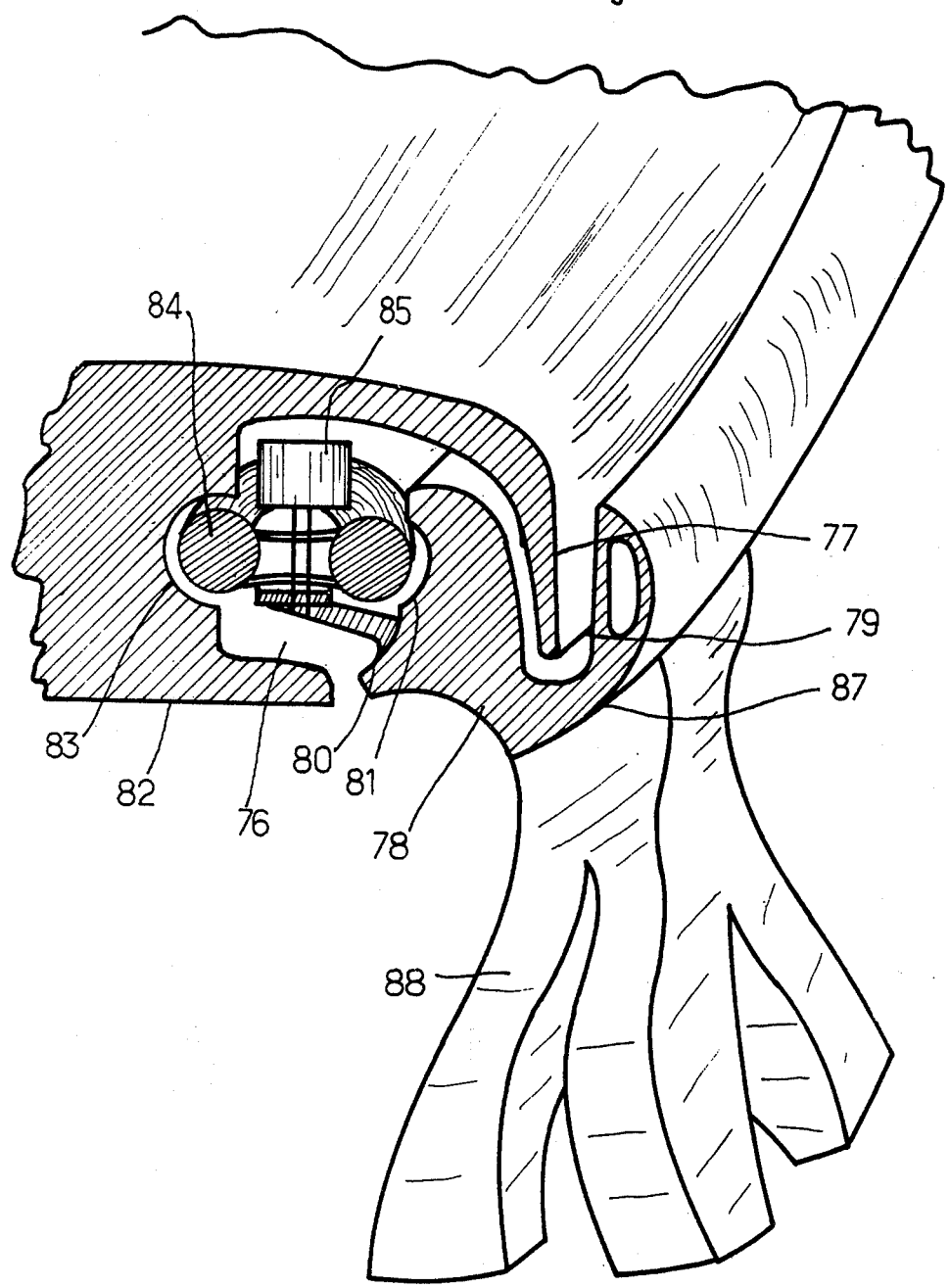
FIG. 8 is a partial perspective view in section of the system for pivoting and generation of electrical energy of the turbine shown in FIG. 6.

With reference to FIG. 8, the disc 61 comprises at its periphery an annular recess 76 open at its lower face. This annular recess 76 can be provided at interior of the peripheral circular beam 62 or it can be formed in prolongation of the concrete disc 61 by a ring of angle shape and of different material, for example, a plastic material whose vertical flange which constitutes the lateral edge 77 of the disc 61 has a length equal to the thickness of the disc.

In this recess 76 is housed a portion of an annular ring 78 which includes a circular groove 79 in which the lateral face 77 of the disc 61 is received (or the vertical flange of the said ring).

The lateral internal face 80 of the annular ring 78 which is situated at the interior of the annular recess 76, comprises a curved roller track 81. Similarly, the face 82 of the annular recess 76 situated closer to the center of the disc 61 comprises a roller track 83 of a profile similar to that of the roller track 81.

Between these two roller tracks 81 and 83, is disposed a series of rollers 84 of toroidal form complementary to that of the roller tracks and whose axles are fixed to the ring 78.

Each one of the rollers 84 drives an electrical generator 85 whose armature is fixed to the ring 78.

The annular recess 76 can be filled as previously noted, with a pressurized gas such as air or nitrogen.

The lower portion 87 of the external peripheral surface of the annular ring 78 has a curved shape which bears on a series of feet 88 whose upper face has a shape of complementary form to that of said portion 87.

This characteristic is particularly advantageous for support of the turbine. In fact, the latter is formed as a watertight sealed container provided with the rings 78 as well as the rollers 84 and the generators 85. The feet 88 are with respect to those realized, of analogous type (of cellular reinforced concrete) but separate. One tows at first the feet to the site and immerses them at the desired place while filling the cells with water. The turbine 61 is then brought to the site and immersed in a manner such that it rests on the feet. It is clear that the profiles of the portion 87 and of the form of the upper part of the feet 88 greatly facilitate this operation.

What is claimed is:

1. A turbine with a current motor adapted to be immersed in water, said turbine comprising:
    a disc having a density near that of the water in which it is immersed in horizontal attitude, said disc having cells containing a mixture of liquid and gas, said disc having upper and lower surfaces,
    means resting on the bottom of the body of water and supporting said disc for rotation,
    at least two blades respectively articulated to the upper and lower surfaces of the disc for pivotal movement about horizontal axes,
    said blades having at least one pocket containing a mixture of gas and of a liquid such that the density of the blades articulated to the upper surface of the disc is less than that of water and the density of the blades articulated to the lower surface of the disc is greater than that of water,
    means for locking the blades in one direction of pivotal movement when the blades reach a vertical position, and
    at least one electrical generator means driven by rotation of said disc.

2. A turbine as claimed in claim 1 wherein said blades extend radially along said disc.

3. A turbine as claimed in claim 1 wherein said disc is provided on said upper and lower surfaces respectively with two series of radial notches in which said blades are received when they are in horizontal retracted position.

4. A turbine as claimed in claim 2 in which said means for locking the blocks comprises struts mounted on said disc.

5. A turbine as claimed in claim 1 wherein said blades have a curved and aerodynamic shape and are distributed along the length of a curvilinear radius on said disc, each blade having an inclination with respect to the corresponding tangent of the respective radius of between 0° and 30°.

6. A turbine as claimed in claim 5 wherein said disc has a circular coaxial opening, and a deflector disposed in said opening and mounted pivotably on the support means resting on the bottom of the body of water.

7. A turbine as claimed in claim 1 wherein said means supporting the disc for rotation comprises a stationary support structure and peripheral rollers supporting said disc and carried by said stationary supporttructure.

8. A turbine as claimed in claim 7 wherein said disc is provided at its periphery with an annular recess open at its lower portion, said stationary support structure comprising an annular ring projecting into said recess and feet resting on the bottom of the body of water and supporting said ring, said ring having a groove in which the lateral external edge of the disc is engaged, said ring having a lateral internal circular face situated at the interior of said annular recess with a roller track, said peripheral rollers being supported by said annular ring, said electrical generator means comprising an electrical generator driven by each said roller, said annular recess being filled with a gas.

9. A turbine as claimed in claim 8 wherein said rollers are of toroidal shape.

10. A turbine as claimed in claim 8 wherein said annular ring has a lower peripheral external surface, said feet having an upper surface of curved shape complementary to that of said annular ring.

* * * * *